United States Patent [19]

Hao et al.

[11] Patent Number: 4,594,655

[45] Date of Patent: Jun. 10, 1986

[54] (K)-INSTRUCTIONS-AT-A-TIME PIPELINED PROCESSOR FOR PARALLEL EXECUTION OF INHERENTLY SEQUENTIAL INSTRUCTIONS

[75] Inventors: Hsieh T. Hao; Huei Ling, both of Chappaqua; Howard E. Sachar, New Paltz, all of N.Y.; Jeffrey Weiss, Providence, R.I.; Yannis J. Yamour, New York, N.Y.

[73] Assignee: International Business Machines Corporation, Armonk, N.Y.

[21] Appl. No.: 475,286

[22] Filed: Mar. 14, 1983

[51] Int. Cl.$^4$ ............................ G06F 7/00; G06F 7/42
[52] U.S. Cl. ................................. 364/200; 364/736; 364/900
[58] Field of Search ... 364/200 MS File, 900 MS File, 364/736, 768, 780, 783

[56] References Cited

U.S. PATENT DOCUMENTS

| | | | |
|---|---|---|---|
| 3,689,895 | 9/1972 | Kitamura | 340/172.5 |
| 3,787,673 | 1/1974 | Watson et al. | 235/156 |
| 3,840,861 | 10/1974 | Amdahl et al. | 340/172.5 |
| 3,928,857 | 12/1975 | Carter et al. | 340/172.5 |
| 3,932,845 | 1/1976 | Beriot | 364/900 |
| 3,949,379 | 4/1976 | Ball | 340/172.5 |
| 3,969,702 | 7/1976 | Tessera | 364/200 |
| 4,057,846 | 11/1977 | Cockerill et al. | 364/200 |
| 4,062,058 | 12/1977 | Haynes | 364/200 |
| 4,085,450 | 4/1978 | Tulpule | 364/900 |
| 4,152,763 | 5/1979 | Shimoi | 364/200 |
| 4,365,311 | 12/1982 | Fukunoga et al. | 364/900 |

OTHER PUBLICATIONS

"Variable I-Fetch", D. K. Hardin, IBM TDB, vol. 20, No. 7, 12/77, pp. 2547-2548.
"Parallel Pipeline Organization of Execution Unit", D. Sofer and W. W. Sproul, III IBM TDB, vol. 14, No. 10, 03/72, pp. 2930-2933.
"Load Bypass for Address Arithmetic", J. S. Liptay and J. W. Rymarczyk, IBM TDB, vol. 20, No. 9, 02/78, pp. 3606-3607.

"Sequential I-Fetching Mechanisms," J. H. Pomerene et al., IBM TDB, vol. 25, No. 1, Jun. 1982, pp. 124-125.
"Eliminating the Overhead of Floating Point Load and Store Instructions by Decoding Two Instructions Per (List continued on next page.)

Primary Examiner—James D. Thomas
Assistant Examiner—Thomas Lee
Attorney, Agent, or Firm—Carl C. Kling

[57] ABSTRACT

Equipping a secondary data flow facility with additional capability, to emulate for certain operations the simultaneous processing of the prerequisite instruction and the dependent instruction, significantly improves simultaneous pipeline processing of inherently sequential instructions (k)-at-a-time, by eliminating delays for calculating prerequisite operands. For example, Instruction $A+B=Z1$ followed by Instruction $Z1+C=Z2$ is inherently sequential, with $A+B=Z1$ the prerequisite instruction and $Z1+C=Z2$ the dependent instruction. The specially equipped secondary data flow facility does not wait for Z1, the apparent input operand from the prerequisite instruction; it simulates Z1 instead, performing $A+B+C=Z2$ in parallel with $A+B=Z1$. All data flow facilities need not be fully equipped for all instructions; the secondary data flow facility may be generally less massive than a primary data flow facility, but is more sophisticated in a critical organ, such as the adder. The three-input adder of the secondary data flow facility emulates the result of a two-input adder of a primary data flow facility, occuring simultaneously in the two-input primary data flow facility adder, adding the third operand to the emulated result, without delay. The instruction unit decodes the instruction sequence normally to control (k)-at-a-time execution where there are no instruction interlocks or dependencies; to delay execution of dependent instructions until operands become available; and to reinstate (k)-at-a-time execution in a limited number of cases by using the additional capability of the secondary data flow facility to emulate the prerequisite operands. A control unit performs housekeeping to execute the instructions.

4 Claims, 10 Drawing Figures

OTHER PUBLICATIONS

Cycle in the Floating Point Unit", T. K. M. Agerwala et al., IBM TDB, vol. 25, No. L, Jun. 1982, pp. 126–129.

Irwin, "A Pipelined Processing Unit for On-Line Division," The 5th Annual Symposium on Computer Architecture, Apr. 3–5, 1978, pp. 24–30, 78CH1284–9C 1979, IEEE.

Irwin and Heller, "Online Pipeline Systems for Recursive Numeric Computations", The 7th Annual Symposium on Computer Architecture, May 6–8, 1980, pp. 292–299, CH1494–4/80/0000–0292 1979 IEEE.

Lang et al., "A Modeling Approach and Design Tool for Pipelined Central Processors," The 6th Annual Symposium on Computer Architecture, Apr. 23–25, 1979, pp. 122–129, CH1394–6/79–0000–0122 1979 IEEE.

Owens et al., "On-Line Algorithms for the Design of Pipeline Architectures", The 6th Annual Symposium on Computer Architecture, Apr. 2 -25, 1979, pp. 12–19, CH1394–6/79/0000–0012 1979, IEEE.

Patel, "Pipelines with Internal Buffers", The 5th Annual Symposium on Computer Architecture, Apr. 3–5, 1978, pp. 249–254, 78CH1284–9C 1979, IEEE.

Data Flow

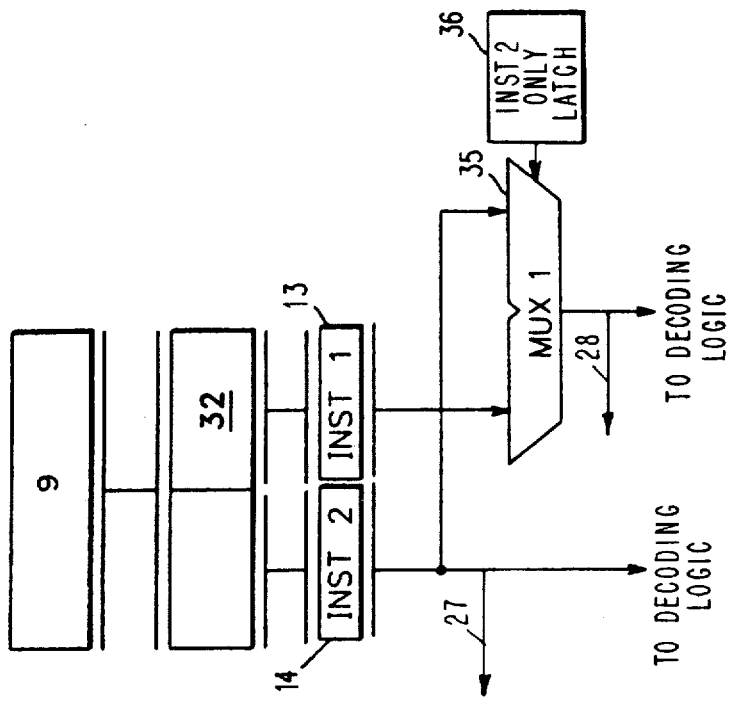

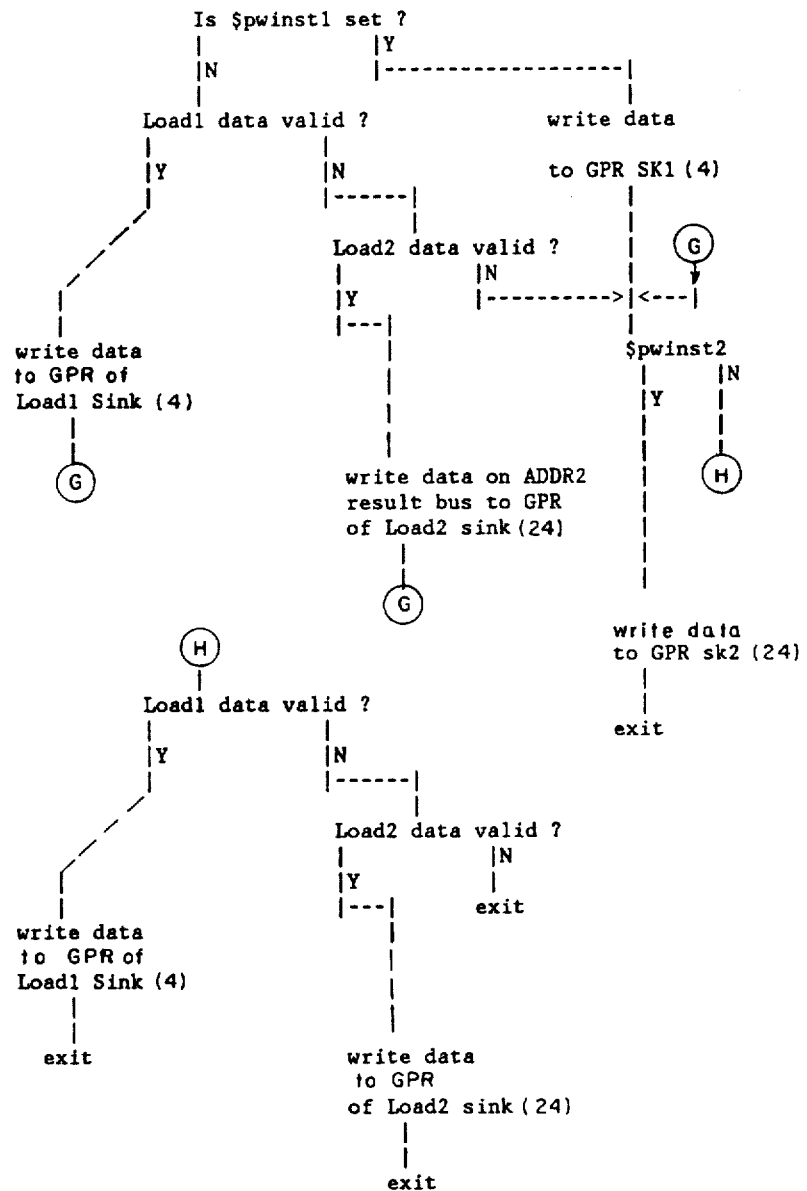
FIG. 4F  PUTAWAY CYCLE

(K)-INSTRUCTIONS-AT-A-TIME PIPELINED PROCESSOR FOR PARALLEL EXECUTION OF INHERENTLY SEQUENTIAL INSTRUCTIONS

BACKGROUND OF THE INVENTION

1. Field of the Invention

This invention relates to stored program computers, and particularly to an improved (k)-instructions-at-a-time pipelined processor for parallel execution of inherently serial instructions by a specially equipped secondary data flow facility which optimizes the instruction processing capability of a pipelined processor by emulating the result of a prerequisite instruction.

2. Description of the Prior Art

Computer processor designs have traditionally incorporated many refinements to achieve increased throughput. All processors accomplish the same basic result by following the sequence of steps:

(1) FETCH INSTRUCTION,
(2) DECODE INSTRUCTION,
(3) FETCH OPERANDS,
(4) EXECUTE INSTRUCTION,
(5) STORE RESULTS.

Many different approaches have been taken to accomplish the above steps at the greatest possible rate. A common approach is the "pipeline." Multiple instructions undergo various phases of the above steps sequentially, as required, but where possible, take place simultaneously insofar as there are no conflicts in demand for hardware or instruction dependencies. Processing instructions two at a time is an obvious desire, but providing economically for hardware demand and instruction dependencies can require expensive replication of hardware and complex control supervision.

A cycle is the period of time required to complete one phase of the pipeline. Commonly, pipelines have three actions:

(1) Staging;
(2) Execution;
(3) Putaway.

Each of these three actions may take one or more phases.

The theoretical limitation on performance for serial pipelined processors is the completion of one instruction per cycle, overlapping Staging, Execution and Putaway for a set of instructions. This is seldom achieved due to instruction interdependencies. The most important interdependencies are:

(1) address generation interlocks;
(2) data dependencies; and
(3) facility lockouts.

An address generation interlock is the inability to compute the address of an operand needed by an instruction until the completion of a previous instruction. A data dependency is the ability to obtain an operand until the completion of a previous instruction. A facility lockout is the inability to use one or more organs of a processor until the completion of a previous instruction which requires the use of the critical organ or organs.

The following representative Patents and Publications demonstrate the context of the prior art:

U.S. Pat. No. 3,689,895, Kitamura, MICRO-PROGRAM CONTROL SYSTEM, Sept. 5, 1972, shows a parallel pipeline architecture in which a single microprogram memory is time-division multiplexed among plural arithmetic units.

U.S. Pat. No. 3,787,673, Watson et al, PIPELINED HIGH SPEED ARITHMETIC UNIT, Jan. 22, 1974, shows an array of computational organs arrayed for individual access so as to have simultaneous execution of arithmetic steps within the arithmetic unit as well as simultaneous execution of instructions in the instruction processing pipeline.

U.S. Pat. No. 3,840,861, Amdahl et al, DATA PROCESSING SYSTEM HAVING AN INSTRUCTION PIPELINE FOR CONCURRENTLY PROCESSING A PLURALITY OF INSTRUCTIONS, Oct. 8, 1974, shows an architecture for a two-cycle, time-offset instruction pipeline to match instructions which use two storage access cycles per execution.

U.S. Pat. No. 3,928,857, Carter et al, INSTRUCTION FETCH APPARATUS WITH COMBINED LOOK-AHEAD AND LOOK-BEHIND CAPABILITY, Dec. 23, 1975, shows an instruction pipeline with a multi-word instruction buffer deployed in anticipation of programming loops.

U.S. Pat. No. 3,949,379, Ball, PIPELINE D.:TA PROCESSING APPARATUS WITH HIGH SP :ED SLAVE STORE, Apr. 6, 1976, shows a pipeline processor with provision to hold an address until data becomes available to store in that address.

U.S. Pat. No. 3,969,702, Tessera, ELECTRONIC COMPUTER WITH INDEPENDENT FUNCTIONAL NETWORKS FOR SIMULTANEOUSLY CARRYING OUT DIFFERENT OPERATIONS ON THE SAME DATA, July 13, 1976, shows a computer architecture with a group of differing functional units arrayed along a bus.

U.S. Pat. No. 4,057,846, Cockerill et al, BUS STEERING STRUCTURE FOR LOW COST PIPELINED PROCESSOR SYSTEM, Nov. 8, 1977, shows housekeeping for steering data along unidirectional busses with overlap of input an output functions.

U.S. Pat. No. 4,062,058, Haynes, NEXT ADDRESS SUBPROCESSOR, Dec. 6, 1977, shows a method for processing a special class of programs wherein determination of the next instruction occurs simultaneously with execution of a preceding set of instructions without the delay inherent in performance of the intervening branch conditions. A special subprocessor reviews the registers in the main processor for branch conditions and obtains the next (branch) address while the main processor is finishing routine processing.

U.S. Pat. No. 3,932,845, Beriot, shows plural execution units having differing speeds, similar to Shimoi, with the difference that Beriot places the fast execution unit and the slow execution unit in parallel, and tries to fit in several short operations during the period taken by one long operation.

U.S. Pat. No. 4,085,450, Tulpule, PERFORMANCE INVARIENT EXECUTION UNIT FOR NON-COMMUNICATIVE INSTRUCTIONS, Apr. 18, 1978, shows a pipeline technique for multiplexing, to three execution units, instructions which are subjected to a mode change if the sequence fits a criterion. Tulpule does not disclose any provision for handling dependent instructions, but rather discloses a standard pipeline in which operands of one instruction are read in parallel with the execution of the previous instruction. Tulpule identifies certain sequences of instructions which can benefit from a mode change from "forward operations" to "reverse operations," a sort of factoring operation to simplify the processing by restating the instruction in a different mode, and implements procedures to convert from forward to reverse mode by manipulating addresses. Tulpule makes special provision for handling reverse register to register instructions by exchanging address pairs within a given execution unit.

U.S. Pat. No. 4,152,763, Shimoi, CONTROL SYSTEM FOR CENTRAL PROCESSING UNIT WITH PLURAL EXECUTION UNITS, May 1, 1979, show plural small, fast, special purpose execution units for certain common instructions, with a backup shaped execution unit for other instructions. This is a parallel pipeline for the favored instructions, with serial backup for other instructions not favored. Shimoi does not deal with inherently sequential instructions.

U.S. Pat. No. 4,365,311, Fukunaga et al, CONTROL OF INSTRUCTION PIPELINE IN DATA PROCESSING SYSTEM, Dec. 21, 1982, shows an architecture for performing instruction processing by segments of instructions in parallel, with individual clocks which vary depending upon conditions.

Agerwala et al, ELIMINATING THE OVERHEAD OF FLOATING POINT LOAD AND STORE INSTRUCTIONS BY DECODING TWO INSTRUCTIONS PER CYCLE IN THE FLOATING POINT UNIT, IBM Technical Disclosure Bulletin, Vol. 25, No. 1, June 1982, pp 126–129, shows a floating point arithmetic unit which two instructions are decoded simultaneously and during the short loops of floating point executions data flows along separate paths simultaneously. The goal is to overlap loads and stores with arithmetic operations. There is no parallel execution of inherently serial instructions.

Hardin, VARIABLE I-FETCH, IBM Technical Disclosure Bulletin, Vol. 20, No. 7, December 1977, pp. 2547–2548, shows a technique for fetching the next instruction at a variable time depending on the availability of storage cycles.

Irwin, "A Pipelined Processing Unit for On-Line Division," the 5th Annular Symposium on Computer Architecture, Apr. 3–5, 1978, pp. 24–30, 78CH1284-9C 1979 IEEE, describes a procedure for designing a pipelined computer.

Irwin and Heller, "Online Pipeline Systems for Recursive Numeric Computations," The 7th Annular Symposium on Computer Architecture, May 6–8, 1980, pp. 292–299, CH1494-4/80/0000-0292 1979 IEEE, describes a pipeline system for recursive numeric computations such as are required in double precision division, and uses a multi-input redundant adder in a segment processing function to build up a full precision result.

Lang et al, "A Modeling Approach and Design Tool for Pipelined Central Processors," The 6th Annular Symposium on Computer Architecture, Apr. 23–25, 1979, pp. 122–129, CH1394-6/79/0000-0122 1979 IEEE, describes a procedure for designing and implementing a control unit for a pipelined computer.

Liptay et al, LOAD BYPASS FOR ADDRESS ARITHMETIC, IBM Technical Disclosure Bulletin, Vol. 20, No. 9, February 1978, pp. 3606–3607, shows a pipelined computer in which the operand address generation process may be dependent upon the results of a subsequent instruction that has been decoded but not yet executed. A bypass mechanism provides that data can be bypassed to the address adder, permitting the address generation cycle to occur a cycle earlier. Initiation of the bypass function occurs when the register to be loaded is the same as required in the subsequent address generation. At the same time the returning data is being sent to the addressed general register, it will also be sent directly to the address adder for use. This bypass technique overcomes a facilities interlock and permits parallel execution of certain instructions otherwise requiring queuing because of facility needs—but there is no parallel execution of inherently serial instructions.

Owens et al, "On-Line Algorithms for the Design of Pipeline Architectures, The 6th Annual Symposium on Computer Architecture, Apr. 23–25, 1979, pp. 12–19, CH1394-6/79/0000-0012 1979 IEEE, describes a procedure for designing and implementing a control unit for a pipelined computer.

Patel, "Pipelines with Internal Buffers," The 5th Annular Symposium on Computer Architecture, Apr. 3–5, 1978, pp. 249–254, 78CH1284-9C 1979 IEEF, describes a pipelined computer with internal buffers and priority schemes to control queue lengths.

Pomerene et al, SEQUENTIAL I-FETCHING MECHANISMS, IBM Technical Disclosure Bulletin, Vol. 25, No. 1, June 1982, pp. 124–125m shows a two-cycle putaway technique which provides for a better overlap by sharng facilities between two operations which are not required simultaneously. If the putaway requires only one cycle, then the next sequential instruction fetch requires only the second putaway cycle while the store operation requires the first putaway cycle. This two-cycle putaway permits the minimization of conflicts of appropriate types, but does not resolve conflicts by parallel execution of inherently serial instructions.

Sofer et al, PARALLEL PIPELINE ORGANIZATION OF EXECUTION UNIT, IBM Technical Disclosure Bulletin, Vol. 14, No. 10, March 1972, pp. 2930–2933, uses a pre-shifter and a post-shifter with the main adder in the mainstream and has a multiplier in a bypass stream connecting at the input to the main adder. A time consuming multiply or divide operation can be carried out by the multiplier while other operations are passing through the main-stream. The mainstream execution loop requires only four cycles. Five cycles are required to complete the execution of mainstream instructions; results are available on the result bus one cycle earlier and may be "fast forwarded" for use as an operand in a subsequent instruction. This fast forward technique saves one cycle out of five.

This prior art establishes a context of pipelined computers, including parallel pipelined computers, but does not teach parallel execution in a parallel pipelined computer of inherently serial instructions.

SUMMARY OF THE INVENTION

This is a limited (k)-instruction-at-a-time data processor which is able to circumvent some of the interlocks implicit in attempting to execute plural instructions simultaneously. Performance improvement is achieved by decoding and executing a limited set of groups of instructions simultaneously, even though some of the members of the groups of instructions are inherently serial. Since these groups previously required separate cycles, but are now treated as groups and executed simultaneously, performance improvement is achieved with a small increment in hardware over the hardware required for a one-instruction-at-a-time pipelined machine.

An object of the invention is to provide instruction pipeline capability and (k)-instruction-at-a-time processing capability for sequences of instructions so as to circumvent a limited set of interdependency lockouts and thereby take advantage of the capability of the (k)-instruction-at-a-time pipelined processor, not only for unrelated instructions but for certain groups of related instructions which might normally be subject to lockout.

If execution requires n operands and a one-at-a-time machine has an n operator facility, then by the addition of an $(n)+(n-1)$ execution facility two instructions may be executed simultaneously, even though the second instruction may require the results of executing the first instruction.

This can be generalized to doing k-at-a-time operations where successive facilities have [n], $[(n)+(n-1)]$, $[(n)+(n-1)+(n-1)]$, $[(n)+(n-1)+(n-1)+(n-1)]$. . . inputs to the facility.

This simplifies to:

$n+(k-1)(n-1)$ where n is the number of inputs to the minimum facility, and k is the data flow facility number.

An advantage is that with a limited increment of facility hardware it is possible to provide a relatively large increment of throughput for programs having significant occurrences of instructions having adjacent-instruction data dependencies of specific kinds.

BRIEF DESCRIPTION OF THE DRAWINGS

FIG. 3 compares a representative sequence of pipelined three-phase (Staging; Execution; Putaway) instruction processing according to normal sequencing with a representative sequence according to this invention.

FIG. 5 is a diagram of instruction gating according to the preferred embodiment of the invention. This is an expansion of Instruction Register and Interlock Detection and Resolution mechanism. (Reference character 12, FIG. 1.)

DESCRIPTION OF THE PREFERRED EMBODIMENT

Figure 1:
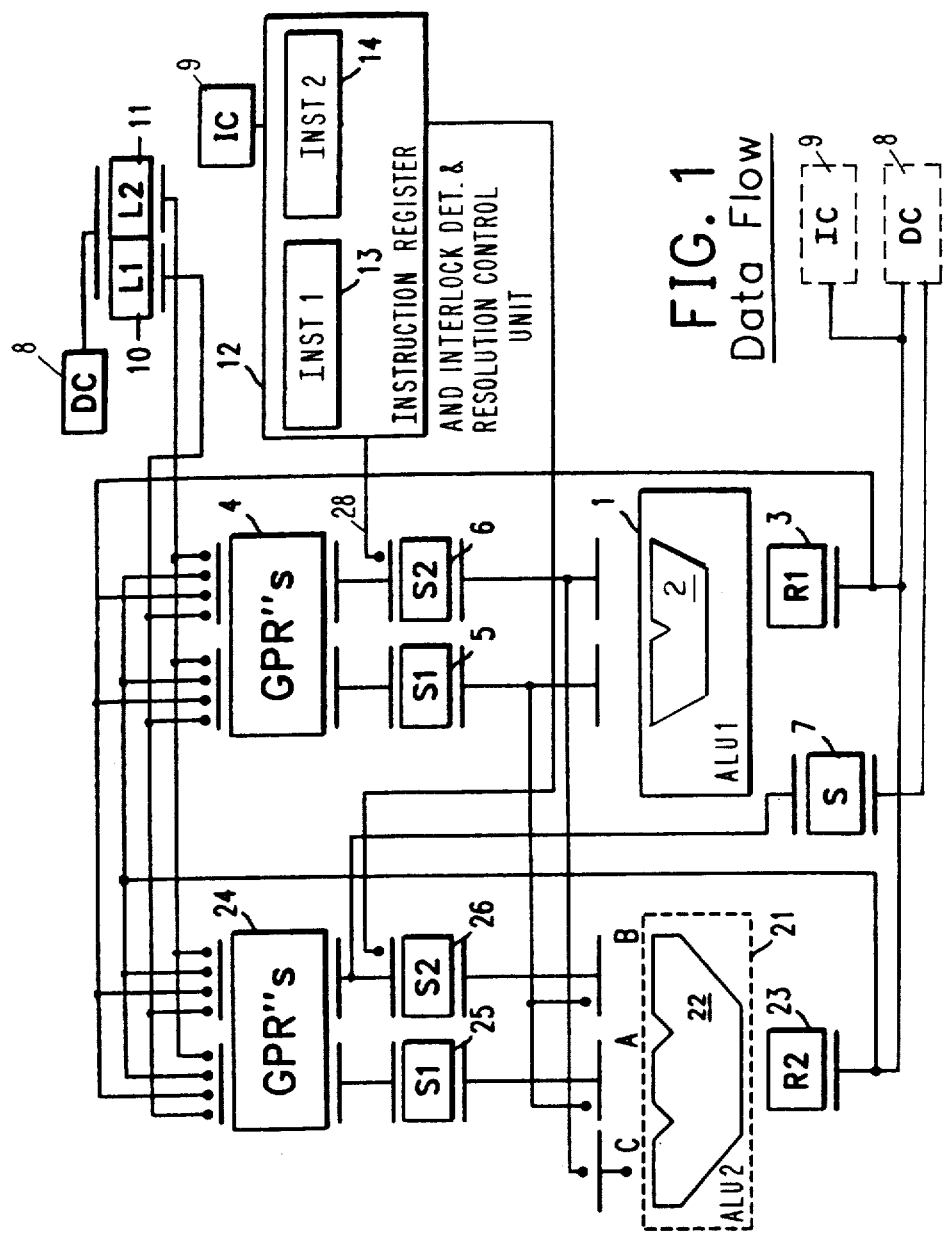
FIG. 1 is a schematic diagram showing data flow through the pipelined processor, which includes primary execution unit and secondary execution unit.

This invention provides a central processing unit the capability to decode, execute and resolve some interdependencies between two instructions in a single cycle.

For the purpose of the preferred embodiment we make the following assumptions:

1. Operations require at most two source registers and one sink register, except STORE instructions which use three source registers (two for address generation and one for data).
2. All instructions are of one length with fixed fields and each instruction fetch brings two instructions.
3. The only non-register-to-register operations are LOAD, STORE and BRANCH instructions.
4. Independent and distinct instruction and data caches exist.
5. No instruction requires more than one cycle in an ALU.

The processor comprises two related but non-identical data flows. The first data flow (items 1, 2, 3, 4, 5, 6, 8, 9, 10, 12, 13, and 28, FIG. 1) contains all the functional organs of a three-stage pipelined processor; the first adder (reference character 2, FIG. 1) is a two-input adder. The second data flow (items 21-26, FIG. 1) has only a three-input adder (reference character 22, FIG. 1). This increased adder capacity, the ability to add an additional operand input, is essential to the invention. Processor control mechanism includes a second instruction decoder. With the three-input binary adder 22 in the secondary processor 21 and with additional staging registers 25-26, the processor can decode and execute two instructions simultaneously under control of interlock detection and resolution logic.

Note the path from (23) to (9) and the path from (3) to (9) are for sending addresses to the caches. The path for (7) to (8) is the path for storing data into the Data cache. The path from (9) to (12) is for bringing instructions from the instruction cache. The path from (8) to (10,11) is for bringing data from the Data cache.

Note the content of 24 and 4 are identical.

An overview of the pipelined processor data flows is shown in FIG. 1. The primary execution unit (right portion of the data path) consists of those functional organs required in a conventional processor, specifically a set of general purpose registers 4, a set of data staging registers 5-6, and an arithmetic and logical unit (ALU1) 2. Alu1 contains a shifter and other functional organs which may be desirable from a performance standpoint.

The secondary execution unit (left portion of FIG. 1) comprises a limited set of functional organs, including a second set of general purpose registers 24, three-input adder 22, additional ports to and from general purpose registers 24, input multiplexers and input staging registers 25-26, and output staging register 23. The secondary execution unit enables the pipelined processor to process an additional instruction, in addition to the primary instruction undergoing execution in the "conventional facilities" of the primary execution unit. Certain logical interlocks presented by the first instruction may be circumvented by the action of the secondary execution unit, as determined and controlled by the control mechanism.

INSTRUCTION UNIT

Instruction unit 12 (FIG. 1) is any pipelined processor instruction unit appropriate for the computer system, replicated for each of the (k) data flow paths. The function of an instruction unit in a pipelined processor is to accept an instruction in a sequence of instructions, to decode the instruction, to identify instruction interdependencies, and to identify to an execution control unit the execution actions appropriate to the instruction.

The instruction unit detects different instruction groups and the execution control means issues different control signals upon the detection of the different instruction groups. Where the current instruction is in a group for which there can be no interdependency, execution is straightforward excluding provision for the interdependency. Where the instruction is in a group for which an interdependency might or might not occur, the instruction code is tested against the instruction code for the previous instruction to determine whether in fact an interdependency occurs. Where the instruction is in a group for which an interdependency always occurs, execution including provision for the interdependency is straightforward.

Pipelined processor instruction units are shown in the prior United States Patents and publications described above. This prior art shows techniques for identifying and dealing with instruction interdependencies in pipelined computer systems. The patents show means for determining which instructions require special handling as a function of a previous instruction, and show control means for carrying out the special handling. FIGS. 2-5 show the requirements of instruction group identification to carry out the invention.

If the second instruction is not dependent upon the execution of the first instruction, and is capable of being executed in the limited facility provided by ALU2 with its three-input adder (such as LOAD REGISTER, STORE REGISTER, and ADD REGISTERS) then it may be executed concurrently with the first instruction. This is concurrent independent instruction execution.

TABLE 1—INSTRUCTION RELATIONSHIPS

K = set of instructions which require only an adder for their execution.
In this embodiment this set includes:
LOADS (The adder is used for address generation.)
STORES (The adder is used for address generation.)
ADD REGISTERS
SUBTRACT REGISTERS
UPDATE ADDRESS AND LOAD
UPDATE ADDRESS AND STORE
J = Set of instructions which update a register and require only the execution capability of ALU2.
In this embodiment this set includes:
ADD REGISTERS
SUBTRACT REGISTERS
UPDATE ADDRESS AND LOAD
UPDATE ADDRESS AND STORE.

If the first instruction is an ADD REGISTER and the second instruction is also an ADD REGISTER, and the two instructions share no registers, then the instructions may be executed simultaneously. This is concurrent instruction execution of the simplest kind.

```
Ex. 0  Two independent ADD REGISTERS
       inst. 1 R3 ← R1 + R2
       inst. 2 R4 ← R5 + R6
       ALU1 (Inst 1) Adder (2, FIG. 1)
       ALU2 (Inst 2) Adder (22, FIG. 1)
```

Execution of Example 0 takes place in the preferred embodiment without taking advantage of the special capability of the invention.

If the first instruction is an ADD REGISTER, and the second instruction is dependent upon the result, then ALU1's operation can be duplicated in two of the three ports of ALU2, and when possible combined with another operand from the second instruction, and executed concurrently with the first instruction. This is concurrent instruction execution of a greater complexity, where the second instruction is dependent on replication of the completion of the first instruction.

Examples where simultaneous execution is allowed:

```
Ex. 1  Two dependent adds
       inst 1 R3 ← R1 + R2
       inst 2 R5 ← R3 + R4
       ALU1 (Inst 1) adder (2 FIG. 1)  R1 + R2
       ALU2 (Inst 2) adder (22 FIG. 1) R1 + R2 + R4
       (Overcomes Data Dependency)
Ex. 2  Add followed by dependent load:
       inst I1 R3 ← R1 + R2
```

```
-continued
       inst I2 Memory ← R3 + R4 (address generation)
       ALU1 (Inst 1) R1 + R2
       ALU2 (Inst 2) R1 + R2 + R4
       (Overcomes Address Generation Interlock)
Ex. 3  Two independent loads:
       inst I1 Memory ← R1 + R2
       inst I2 Memory ← R3 + R4
       I1 adder R1 + R2
       I2 adder R3 + R4
       (Independent Group)
```

Examples where simultaneous execution is not allowed:

```
Ex. 4  Shift followed by a dependent add:
       inst I1 R3 ← R1 (Shifted)
       inst I2 R4 ← R3 + R2
       I1 shifter R1
       (Unresolvable Interlock)
Ex. 5  Add followed by a shift:
       inst I1 R3 ← R2 + R1
       inst I2 R5 ← R4 (Shifted)
       I1 adder R2 + R1
       (Shifter Path Not Available to I2)
```

CONTROLS

Control unit 12 (FIG. 1) decodes two instructions simultaneously and resolves the interlocks between them and any previous instructions in the processor pipeline which have not completed execution. Control unit 12 must first determine if the first instruction can execute. This consists of determining whether facilities required to execute the first instruction are available.

Control unit 12 (FIG. 1) must then determine whether or not the second instruction can execute, by determining whether facilities required to execute the second instruction are available, after allocating facilities for use by the first instruction and any previous instruction still requiring facilities, and whether there is an instruction dependency on the first instruction for its results. Further details will follow, in connection with discussion of FIGS. 4A-4F.

While it would be possible to treat the first instruction and second instruction as co-equals vying for facilities, in practice the instruction stream is sequenced so that the earlier instruction normally takes precedence, and in this preferred embodiment this convention is followed.

Execution control means are shown, for example, in U.S. Pat. Nos. 3,689,895, Kitamura, MICRO-PROGRAM CONTROL SYSTEM, Sept. 5, 1972 and 3,787,873, Watson et al, PIPELINED HIGH SPEED ARITHMETIC UNIT, Jan. 22, 1974.

The choice of instruction unit and execution control means and the detailing of these organs of the computer are made by the system designer. Once these organs are defined, and the repertoire of instructions is determined, then the system designer determines which instructions are so subject to conflict that interlocks, data dependencies or facility lockouts are to be identified by the instruction unit and controlled by the control means. The system designer then provides hardware or software decoding to carry out the desired identification and control.

Figure 2:
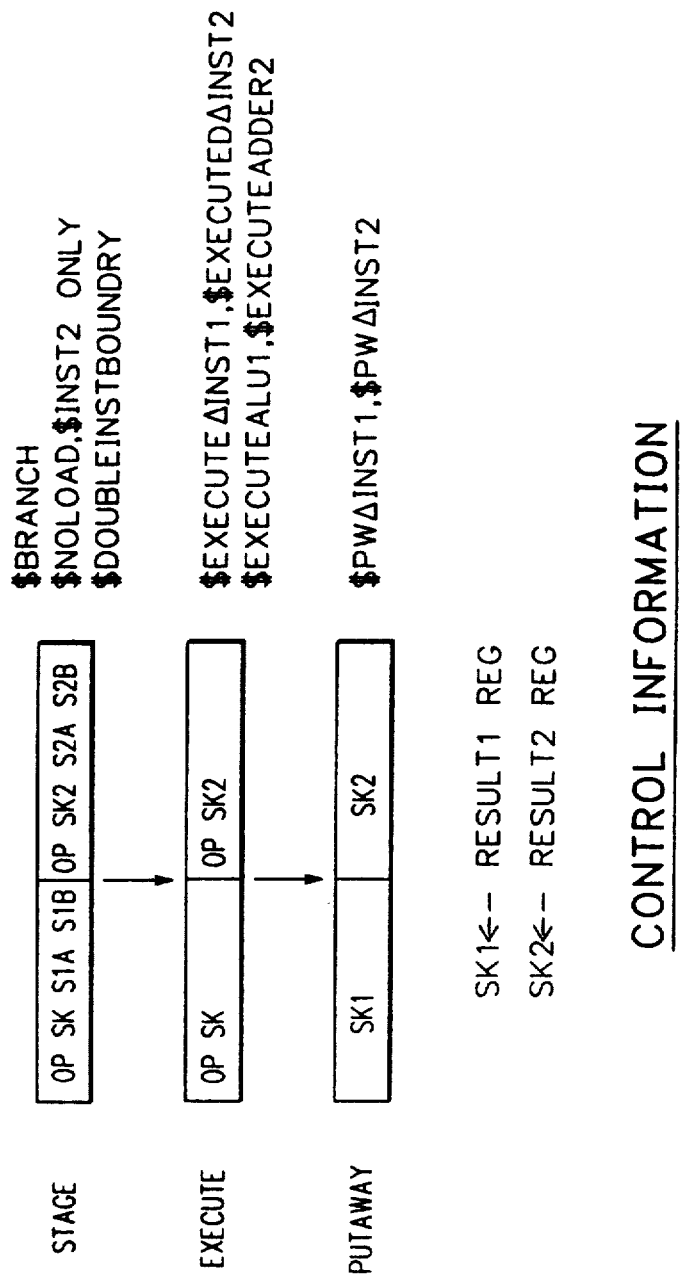
FIG. 2 illustrates control information for the pipelined processor of FIG. 1.

FIGS. 2-4 illustrate the sequences followed. FIG. 2 shows the control information for a representative set of instructions. In standard fashion for a pipelined processor, there are three steps to a representative instruction processing sequence, as follows:
1. Staging;
2. Execution; and
3. Putaway.

These three steps may be overlapped for sequentially adjacent instructions which do not present dependencies.

The following definitions in FIG. 2 apply also to the other Figures:
OP = operation code
SK1 = sink register for instruction 1
SK2 = sink register for instruction 2
S1A, S1B = source registers for instruction 1
S2A, S2B = source registers for instruction 2
$ = signal used for control purposes FIG. 3 illustrates the overlap potential. In the upper grouping, a simple pipeline operation is carried out with overlap of the Staging step of I2 with the Execution step of I1, and so forth.

In the lower grouping of FIG. 3, the more sophisticated overlaps take place as made available by this invention:
I1 and I2 are fully overlapped; they are executed simultaneously.
I3 and I4 are similarly overlapped; they are executed simultaneously.
I5 and I6 are determined to be fraught with facility lockouts or address generation interlocks; they are not executed simultaneously; I6 is delayed.

FIG. 4 is a detail chart of data handling in the preferred embodiment. There is a three-stage pipeline, with Staging Cycle, Execution Cycle and Putaway Cycle. Normally the actions taken during these cycles are the following:
STAGE—Access source GPRs (general purpose registers). Copy any required immediate fields from I-REG into Staging Reg.
EXECUTE—Execute operation on staged data and hold result in Result Reg. For store instruction access GPR containing data to be stored and copy data into Store Raging Reg.
PUTAWAY—Copy result into sink GPR. For load and store instructions the result is a data address which is sent to the data cache. For Branch instructions the result is an instruction address which is sent to the instruction cache.

Figure 4A:
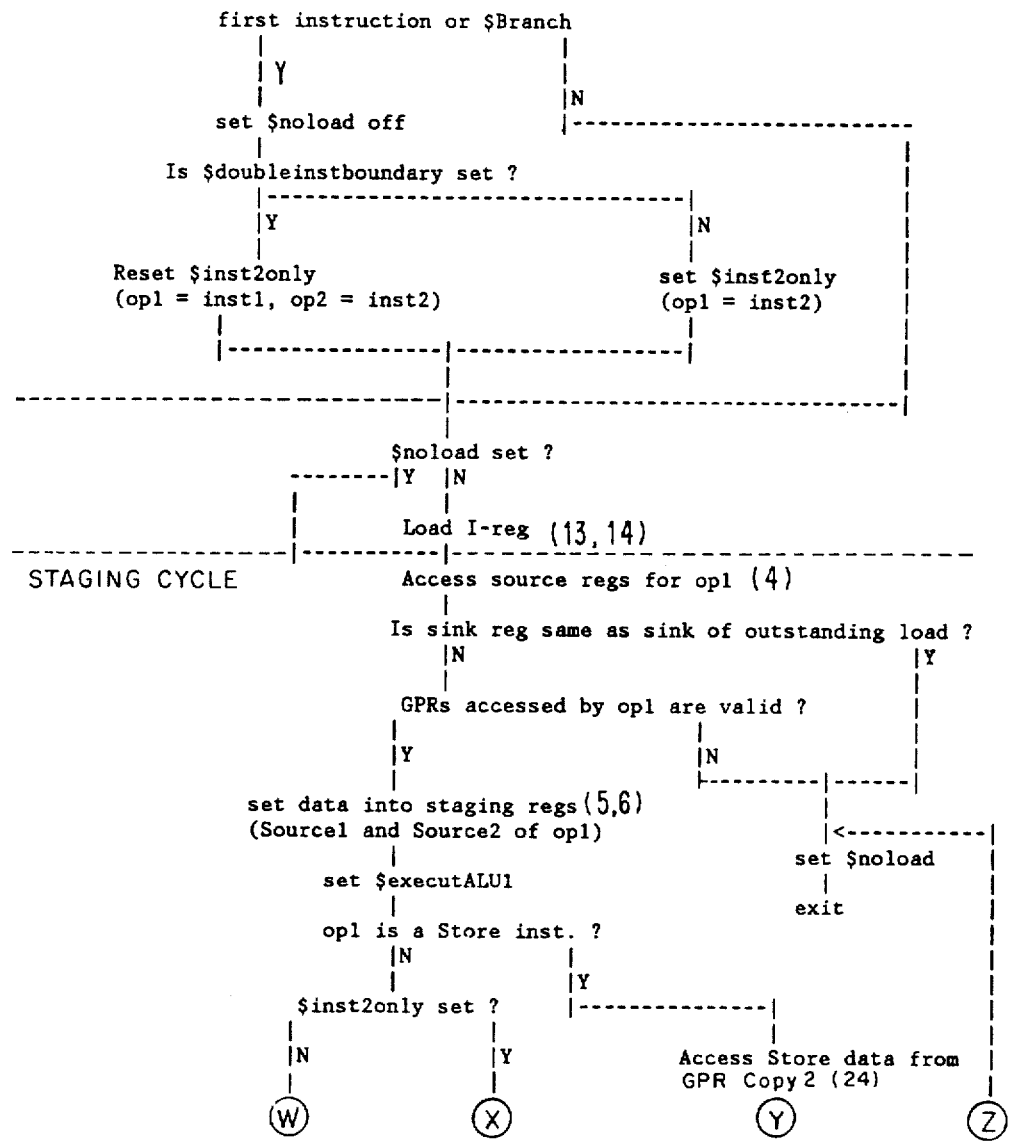
FIG. 4 (4A-4F) is a detail chart of data handling during representative sequences according to the invention.
Figure 4B:
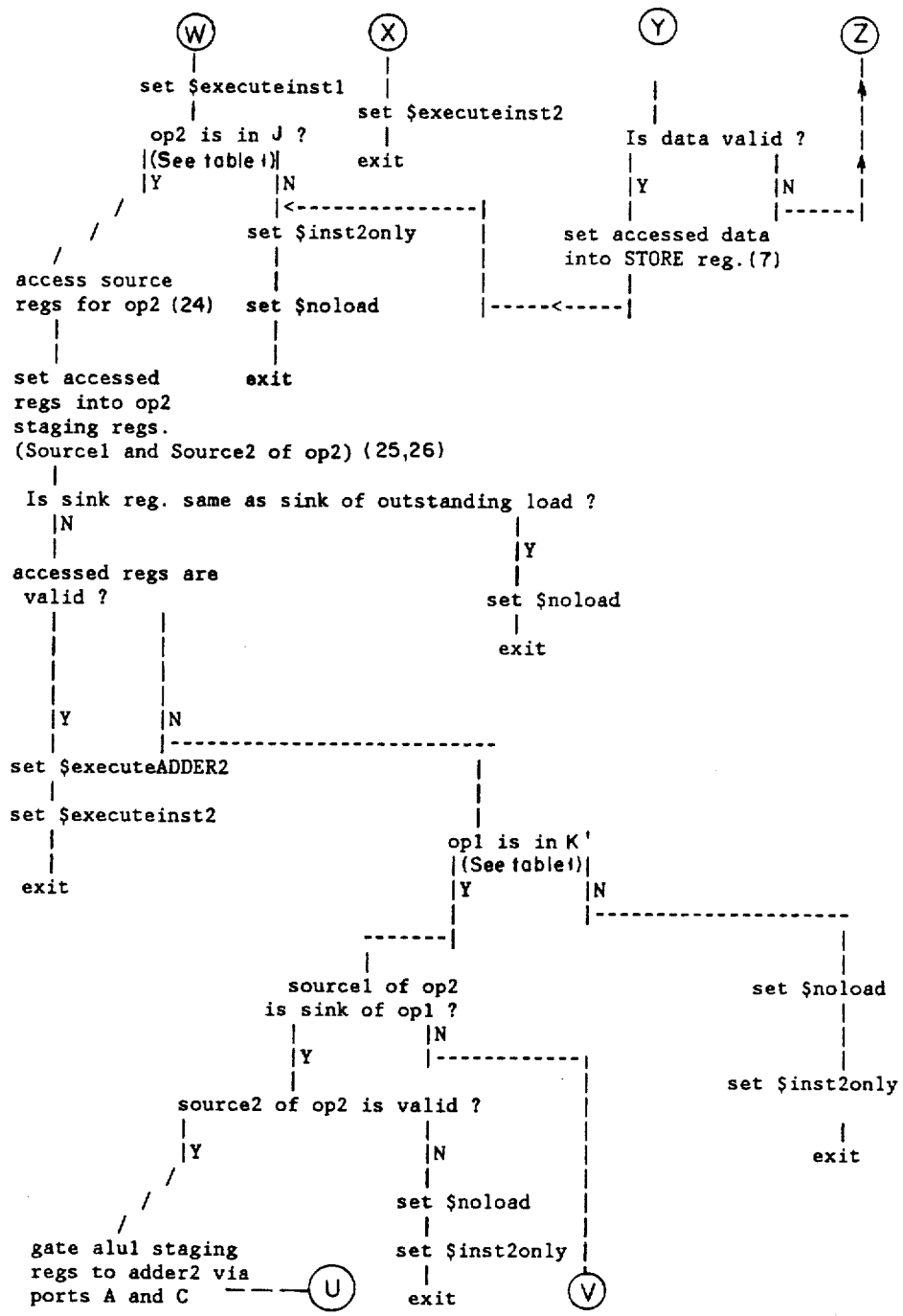
Figure 4C:
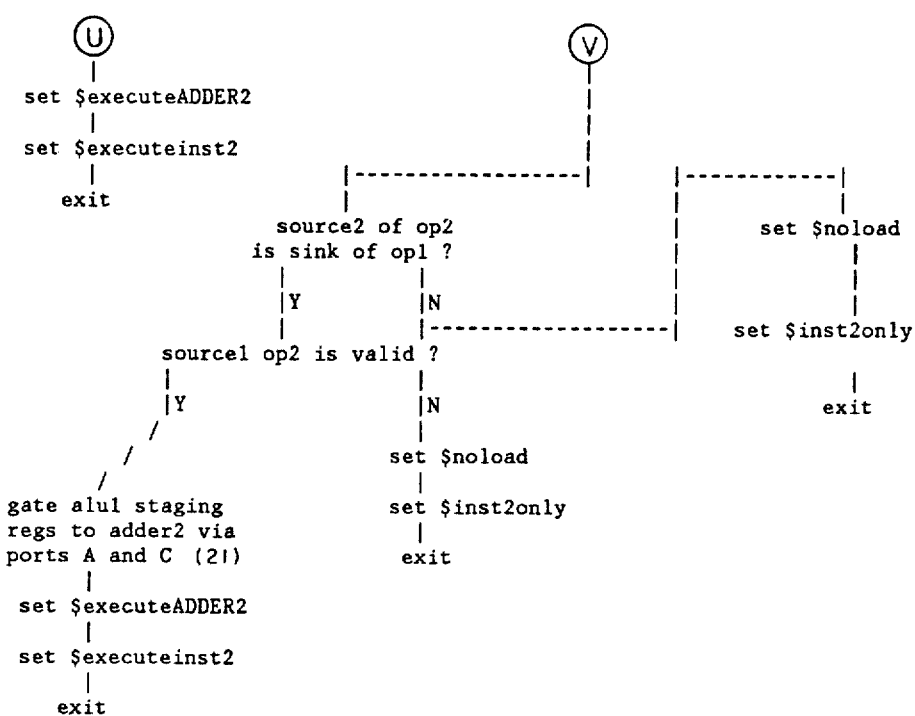

FIGS. 4A-4C illustrate the controls for the Staging Cycle. A number of differing situations are accommodated, including the situation at the bottom of FIG. 4C in which the instruction 1 result is replicated internally in order to carry out instruction 2, which requires the instruction 1 result as an operand.

Figure 4D:
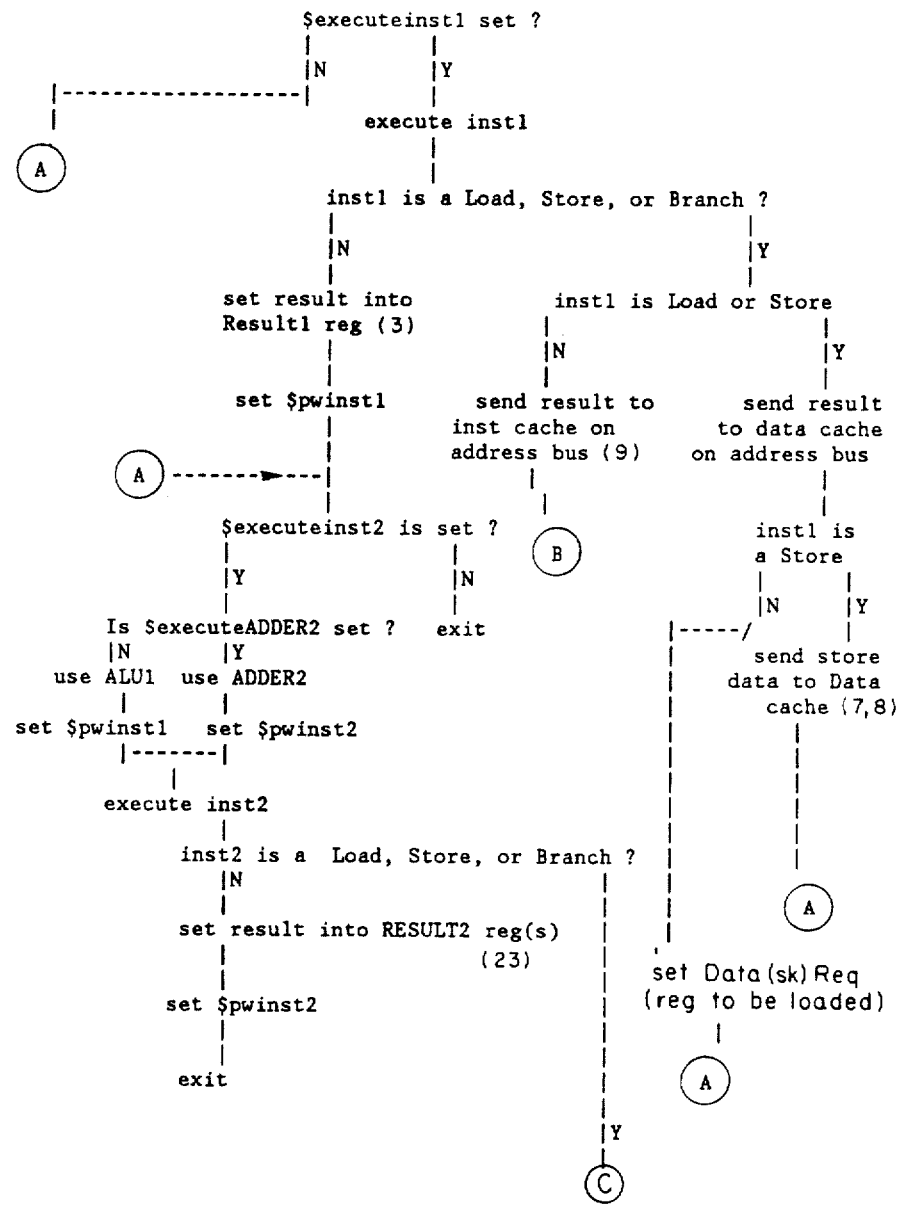
Figure 4E:
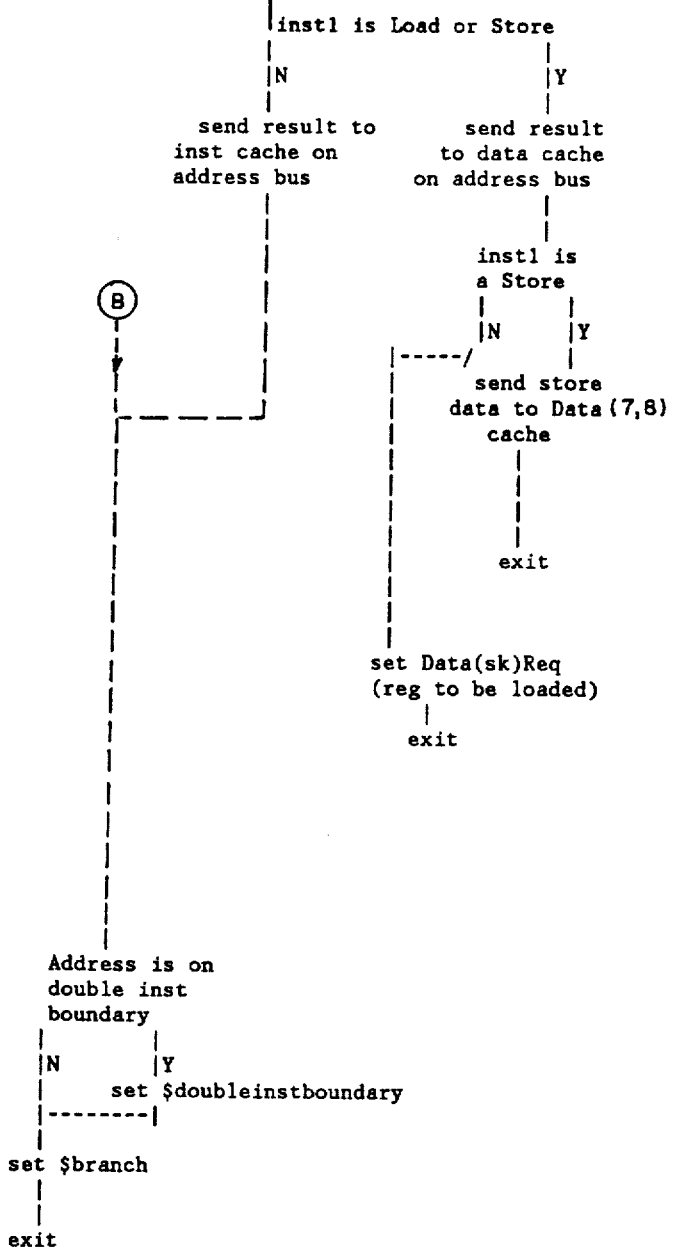

FIGS. 4D-4F illustrate the controls for the Execution Cycle.

FIG. 4F illustrates the controls for the Putaway Cycle.

FIG. 4A includes control information for a portion of the previous PUTAWAY CYCLE along with control information for the early part of the STAGING CYCLE appropriate to the invention. The previous PUTAWAY CYCLE (PORTION) is enclosed in a box in FIG. 4A. The PUTAWAY CYCLE ends with instructions loaded into Instruction Registers 13 and 14 of FIG. 1.

As the STAGING CYCLE begins, controls call for "Access source regs for OP1" which accesses OP1 information from GPR's 4 in FIG. 1. Data is set into the staging registers S1 and S2 (5,6 in FIG. 1). In the appropriate situation (a Store instruction) store data is accessed from GPR's 24 (FIG. 1) for the secondary data flow.

FIG. 5 illustrates the mechanism for the pipelined processors instruction fetching in this embodiment. During operation, instruction cache 9 contains a sequence of instructions. These instructions are read out of instruction cache 9 two-at-a-time, via buffer 32, to instruction registers 13 and 14.

The two instructions may be inherently independent, may be inherently sequential but susceptible to parallel execution by the pipelined processor, or may be subject to interlocks which require serial processing.

Instruction registers 13–14 make the instructions available to instruction decoders, which provide instruction control signals to the various functional organs.

VARIATIONS

The preferred embodiment is a pipelined processor with a parimary ALU (ALU1) having a full range of functional organs, while the secondary ALU (ALU2) has only a single functional organ (adder 22) of increased capability.

Other choices of functional organ with increased capability can be made. A shifter, for example, might be the functional organ of choice for emphasis.

It is also possible to extend the invention to three-at-a-time ir (k)-at-a-time processing, by providing an extrapolated control circuit and (k) data flow facilities, where successive facilities have $[n]$, $[(n)+(n-1)]$, $[(n)+(n-1)+(n-1)]$, $[(n)+(n-1)+(n-1)+(n-1)]$... inputs to the facility. Simplified, the number of inputs to a given facility is:
$[(n)+(k-1)(n-1)]$ where n is the number of inputs to the minimum facility, and k is the facility number in increasing order of complexity.

With proper care in housekeeping, it is possible through this invention to have a number of data flow facilities each having capability of accepting more than the minimum number of inputs. With two data flow facilities each having a three-input adder, for example, it is possible to provide for simultaneous execution of instructions calling for a reference capability two-input adder in the primary data flow facility, and a three-input adder in the secondary data flow facility. The primary three-input adder has applied to it the same two operands as would have been applied to a two-input adder. Thus, while wasteful of adder capability, may be advantageous in standardized design and in flexibility. Designation of primary data flow facility and secondary data flow facility is arbitrary in such a variation.

What is claimed is:
1. A pipelined processor comprising
(a) a pipeline instruction control unit;
(b) at least one primary data flow facility having a plurality of inputs and having a subassembly processing a finite number (n) of said inputs in parallel, to process a stream of instructions defined by the instruction control unit;
(c) one or more secondary data flow facilities having a plurality of inputs and each said data flow facility having a subassembly processing a greater number $(n)+(k-1)(n-1)$ of said inputs than the finite number of inputs being processed by said primary data flow facility, said secondary data flow facility comprising at least one comparable subassembly similar in function to said subassembly in said primary data flow facility but with a greater number of inputs, whereby said secondary data flow facility can process all the inputs required to emulate the apparent result of processing by said comparable subassembly of the primary data flow facility and process said apparent result together with an additional input;

(d) an instruction unit comprising means to detect adjacent instruction groups including:
  interlocked instruction sequences where on adjacent instruction necessarily must be delayed pending completion of another;
  adjacent instruction sequences in which one of a group of adjacent instructions requires operand inputs including an operand input which is the result of processing the operand inputs for another instruction of the group; and
  independent adjacent instruction sequences which require unrelated operand inputs;

(e) control means connected to said instruction unit and said primary and secondary data flow facilities to control simultaneous processing of dependent adjacent instruction sequences and independent adjacent instruction sequences, and to delay processing of appropriate instructions when necessary in interlocked instruction sequences;

wherein said primary data flow facility is a minimum data flow facility equipped to process inputs, and said one or more secondary data flow facilities, in sequence by complexity, are equipped to process $(n)+(k-1)(n-1)$ inputs, where (n) is the number of inputs to said minimum facility, (n) being an integer equal to or greater than 1, and (k) is the facility sequence position number.

2. A pipelined processing comprising:
(a) a pipeline instruction control unit,
(b) a primary data flow facility having inputs and having a reference capability to process a stream of instructions defined by said instruction control unit, said primary data flow facility comprising an (n)-input adder to produce for a given instruction a result;

(c) a secondary data flow facility having inputs and capability different from said reference capability of the primary data flow facility, comprising a $(2n-1)$-input adder so that the secondary data flow $(2n-1)$-input adder can process said inputs to said primary data flow facility n-input adder to emulate said result of processing by said (n)-input adder of said primary data flow facility as a subset of its input set;

(d) an instruction unit comprising means to detect adjacent instruction groups including:
  interlocked instruction sequences where one adjacent instruction necessarily must be delayed pending completion of another;
  adjacent instruction sequences in which one of a group of adjacent instructions require operand inputs including an operand input which is the result of processing the operand inputs for another instruction of the group; and
  independent adjacent instruction sequences which require unrelated operand inputs; and (e) control means connected to said instruction unit and said primary and secondary data flow facilities to control simultaneous processing of dependent adjacent instruction sequences and independent adjacent instruction sequences, and to delay processing of appropriate instructions when necessary in interlock instruction sequences.

3. A pipelined processing according to claim 2, in which said $(2n-1)$-input adder of said secondary data flow facility is a three-input adder and the said n-input adder of said primary data flow facility is a two-input adder.

4. A pipelined processor according to claim 3, further comprising means in said primary data flow facility to provide first and second operands to said two-input adder, to produce a third operand result, and means in said secondary data flow facility simultaneously to provide first, second and fourth operands to said three-input adder, whereby said three-input adder simultaneously computes a result emulating inputs including the third operand result of computation by said two-input adder and fourth operand.

* * * * *